(12) United States Patent
Scruggs et al.

(10) Patent No.: US 12,337,562 B2
(45) Date of Patent: Jun. 24, 2025

(54) CURED TIRE SUPPORT COOLING FIXTURE

(71) Applicants: COMPAGNIE GENERALE DES ETABLISSEMENTS MICHELIN, Clermont-Ferrand (FR); Johnny Irvin Scruggs, Boiling Springs, NC (US)

(72) Inventors: Johnny Irvin Scruggs, Boiling Springs, NC (US); Lain Radford Smith, Lexington, SC (US); Jay Joseph Baudendistel, Greer, SC (US); Douglas R. Douds, Tuscaloosa, AL (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 92 days.

(21) Appl. No.: 18/005,436

(22) PCT Filed: Jul. 31, 2020

(86) PCT No.: PCT/US2020/044414
§ 371 (c)(1),
(2) Date: Jan. 13, 2023

(87) PCT Pub. No.: WO2022/025912
PCT Pub. Date: Feb. 3, 2022

(65) Prior Publication Data
US 2023/0256694 A1    Aug. 17, 2023

(51) Int. Cl.
*B29D 30/00* (2006.01)
*B65G 39/12* (2006.01)
*F16M 11/22* (2006.01)

(52) U.S. Cl.
CPC ......... *B29D 30/0016* (2013.01); *B65G 39/12* (2013.01); *F16M 11/22* (2013.01);
(Continued)

(58) Field of Classification Search
CPC ........ B29D 30/0016; B29D 2030/0027; B65G 39/12; B65G 2201/0273; F16M 11/22
See application file for complete search history.

(56) References Cited

U.S. PATENT DOCUMENTS

| 3,692,444 A | 9/1972 | Hugger |
| 3,852,008 A | 12/1974 | Shichman |

(Continued)

FOREIGN PATENT DOCUMENTS

| DE | 202019104640 U1 * | 1/2020 |
| DE | 102019200221 A1 * | 7/2020 |

(Continued)

OTHER PUBLICATIONS

European Patent Office, International Search Report dated Mar. 30, 2021, pp. 1-11 (included), European Patent Office, Rijswijk, The Netherlands.

*Primary Examiner* — Gene O Crawford
*Assistant Examiner* — Abby A Jorgensen
(74) *Attorney, Agent, or Firm* — Neal P. Pierotti

(57) ABSTRACT

An apparatus is provided that has a frame, and a first cup segment that has a first contact surface that is both curved and inclined relative to a vertical direction. The first cup segment is movable relative to the frame. The first contact surface is configured for engaging a warm, cured tire for holding. The tire has a sidewall, and a tread with a tread edge and a tread contact surface. The first contact surface is configured for engaging the tread and is not configured for engaging the sidewall for holding.

11 Claims, 9 Drawing Sheets

(52) U.S. Cl.
CPC ................ *B29D 2030/0027* (2013.01); *B65G 2201/0273* (2013.01)

(56) References Cited

U.S. PATENT DOCUMENTS

| | | | |
|---|---|---|---|
| 3,956,443 A | | 5/1976 | Shichman |
| 4,092,090 A | | 5/1978 | Yuhas et al. |
| 5,250,252 A | | 10/1993 | Siegenthaler |
| 7,963,755 B1 | | 6/2011 | Rose |
| 9,746,396 B2 | | 8/2017 | Seimoto et al. |
| 2008/0142416 A1 | * | 6/2008 | Lawson ............. B29D 30/0016 414/800 |
| 2013/0036750 A1 | | 2/2013 | Wegel |
| 2013/0336750 A1 | * | 12/2013 | Marti .................. B65G 1/0435 414/276 |

FOREIGN PATENT DOCUMENTS

| | | | | |
|---|---|---|---|---|
| JP | 11079334 A | | 3/1999 | |
| JP | H1179334 A | * | 3/1999 | |
| JP | 2016215513 A | * | 12/2016 | |
| KR | 20200000723 A | * | 1/2020 | |
| KR | 1020200000723 A | | 1/2020 | |
| WO | WO-2013027335 A1 | * | 2/2013 | ......... B29D 30/0016 |

\* cited by examiner

CURED TIRE SUPPORT COOLING FIXTURE

CROSS-REFERENCE TO RELATED APPLICATIONS

The present application is a 35 U.S.C. § 371 application of PCT/US2020/044414 filed on Jul. 31, 2020 and entitled "Cured Tire Support Cooling Fixture."

FIELD OF THE INVENTION

The present invention relates generally to a fixture for holding a cured tire while the tire cools. More particularly, the present application involves a cured tire fixture that supports a cured tire for cooling by engaging only the tread of the cured tire to prevent deformation of the cured tire during cooling.

BACKGROUND

The construction of tires involves laying several different layers of material, most of which include uncured rubber, onto one another for assembly into a green tire. This green tire is then placed into a mold where heat and pressure are applied to the tire for a sufficient amount of time to cure the green tire. The now cured tire is removed from the mold, and subsequent processing steps on the cured tire are conducted. However, upon removal from the mold the cured tire will be hot and it may be necessary to cool the cured tire before these subsequent processing steps. The tire can be laid on its side to cool, however this positioning during cooling causes sidewall and bead deformation. The warm tire will collapse under its own weight thus causing this deformation. To prevent tire deformation, it is known to mount the warm cured tire onto a fixture and inflate the tire so that its shape is maintained during cooling. This cooling process involves the use of equipment and additional steps that add to cost and complexity of the tire production process. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
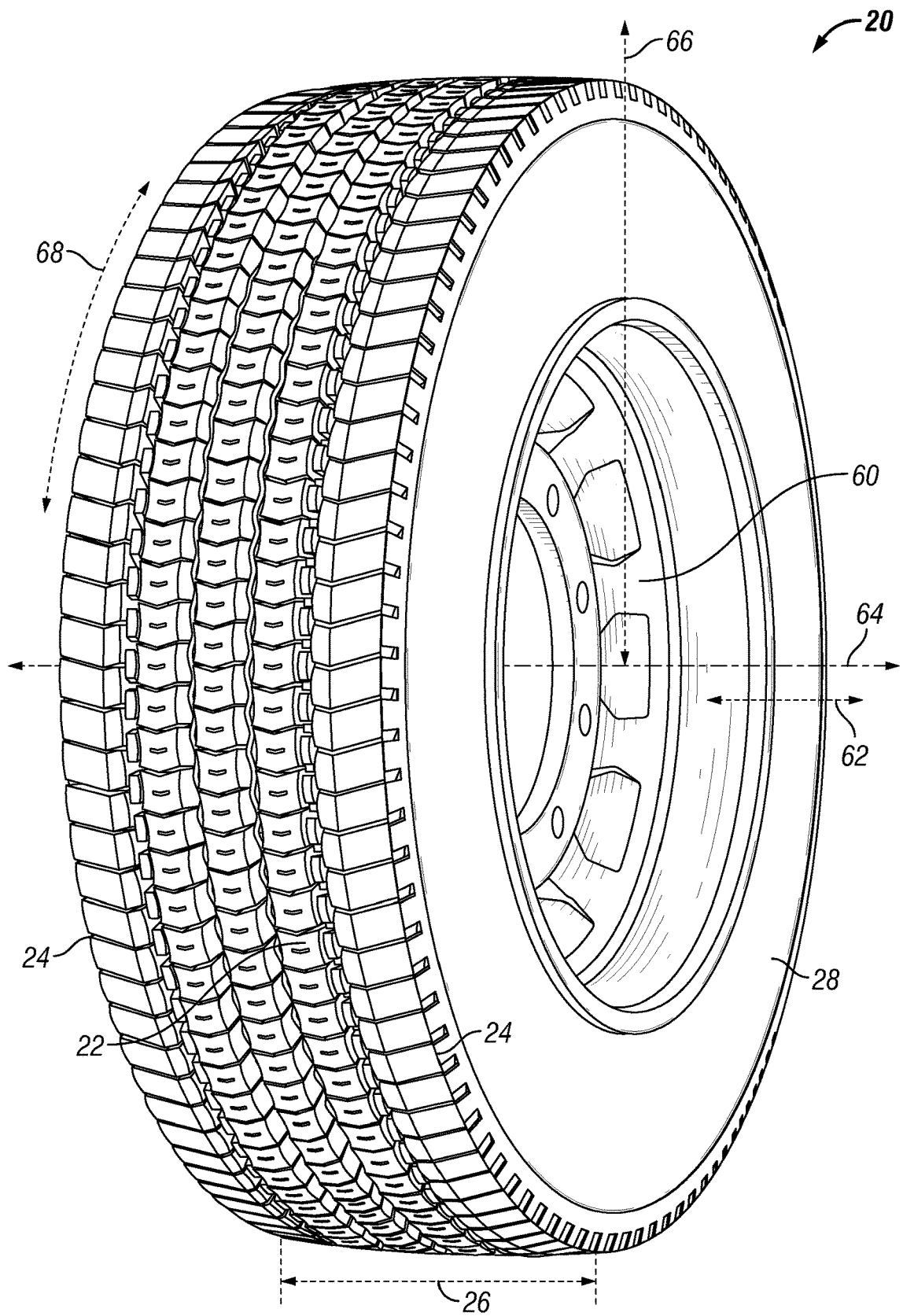
FIG. 1 is a perspective view of a tire on a rim.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that receives a cured tire 20 after the cured tire 20 is molded. The cured tire 20 is warm and is placed within the apparatus 10 for cooling. The apparatus 10 features one or more cup segments 14 that have contact surfaces 16 configured in such a manner that only the tread 22 of the cured tire 20 engages the cup segments 14. The cured tire 20 is then held by the cup segment 14 until such time that the warm cured tire 20 is sufficiently cooled. While being held and cooled, the sidewalls 28 of the cured tire 20 do not engage the cup segments 14. This arrangement may prevent sidewall 28 and bead deformation that would otherwise occur if the tire 20 were cooled while laying on its side. The apparatus 10 allows for cooling of the cured tire 20 without requiring the tire 20 be inflated during the cooling process, while at the same time preventing deformation of the tire 20 that would otherwise occur if the tire 20 were cooled with force being applied to its sidewall 28.

FIG. 1 shows a tire 20 mounted onto a metal rim 60 for placement onto a vehicle. The tire 20 is a cured tire 20 in that it has been molded through the application of sufficient heat, pressure and time to transition from a green tire to a cured tire 20. The tire 20 includes a carcass that has a sidewall 28 onto which tread 22 is positioned. The tread 22 can be variously shaped and can include a series of grooves, blocks, sipes, and other architectural features. The tread 22 is disposed on the crown portion of the carcass and is adjacent the sidewall 28 of the tire 20. The tire 20 has an axis 64 disposed through its center which extends in the axial direction 62. The circumferential direction 68 extends around the axis 64 and is the direction of travel of the tire 20 as it rotates about the axis 64 while the vehicle is being driven. The tread 22 extends completely, 360 degrees about the axis 64 in the circumferential direction 68. The circumferential direction 68 can be referred to as the longitudinal direction 68. The radial direction 66 may be referred to as the thickness direction and is perpendicular to and extends from the axis 64 such that the tread 22 is located farther from the axis 64 in the radial direction 66 than the sidewall 28 which is closer to the axis 64 in the radial direction 66.

The tread 22 has a tread contact surface 26 which is the portion of the tread 22 that engages the ground when the tire 20 is driven. The tread contact surface 26 enters what is known as the contact patch of the tire 20, which is the surface of the tread 22 that directly contacts the ground when the tire 20 is driven. The tread contact surface 26 is designated by a line in FIG. 1 that extends in the axial direction 62, but it is to be understood that the tread contact surface 26 is not a line but is in fact the entire surface of the tread 22 in the circumferential direction 68 that extends completely around the tire 20. The tread 22 has a tread edge 24 between which the tread contact surface 26 extends in the axial direction 62. The tread 22 also has portions of it that are outside of the tread contact surface 26 and these portions of the tread 22 are those that are adjacent the sidewall 28. Portions of the tread 22 outboard from the tread edge 24 may not engage the ground during operation of the tire 20, and the sidewall 28 may not engage the ground during operation of the tire 20. The tread edge 24 need not be a line as the geometry of the tread 22 may provide for a smooth transition from the tread contact surface 26 to the sidewall 28. The tread edge 24 may therefore be some amount of surface having components in the circumferential direction 68, radial direction 66, and axial direction 62.

A green tire is placed into a mold which applied heat and pressure to the green tire for a certain amount of time to cure the green tire into the cured tire 20. Once the tire 20 is cured, the press is opened and the warm, cured tire 20 is transported to the apparatus 10 for cooling. The tire 20 at this point does not have the rim 60 as shown in FIG. 1. It is to be understood that the tire 20 is not put onto the rim 60 until the tire 20 has been fully constructed and is ready for use by the consumer on his or her vehicle. The tire 20 as thus used with the apparatus 10 will not have the rim 60 included, but in some embodiments, it is theoretically possible for the rim 60 to be in fact present when the tire 20 is cooled via the apparatus 10.

Figure 2:
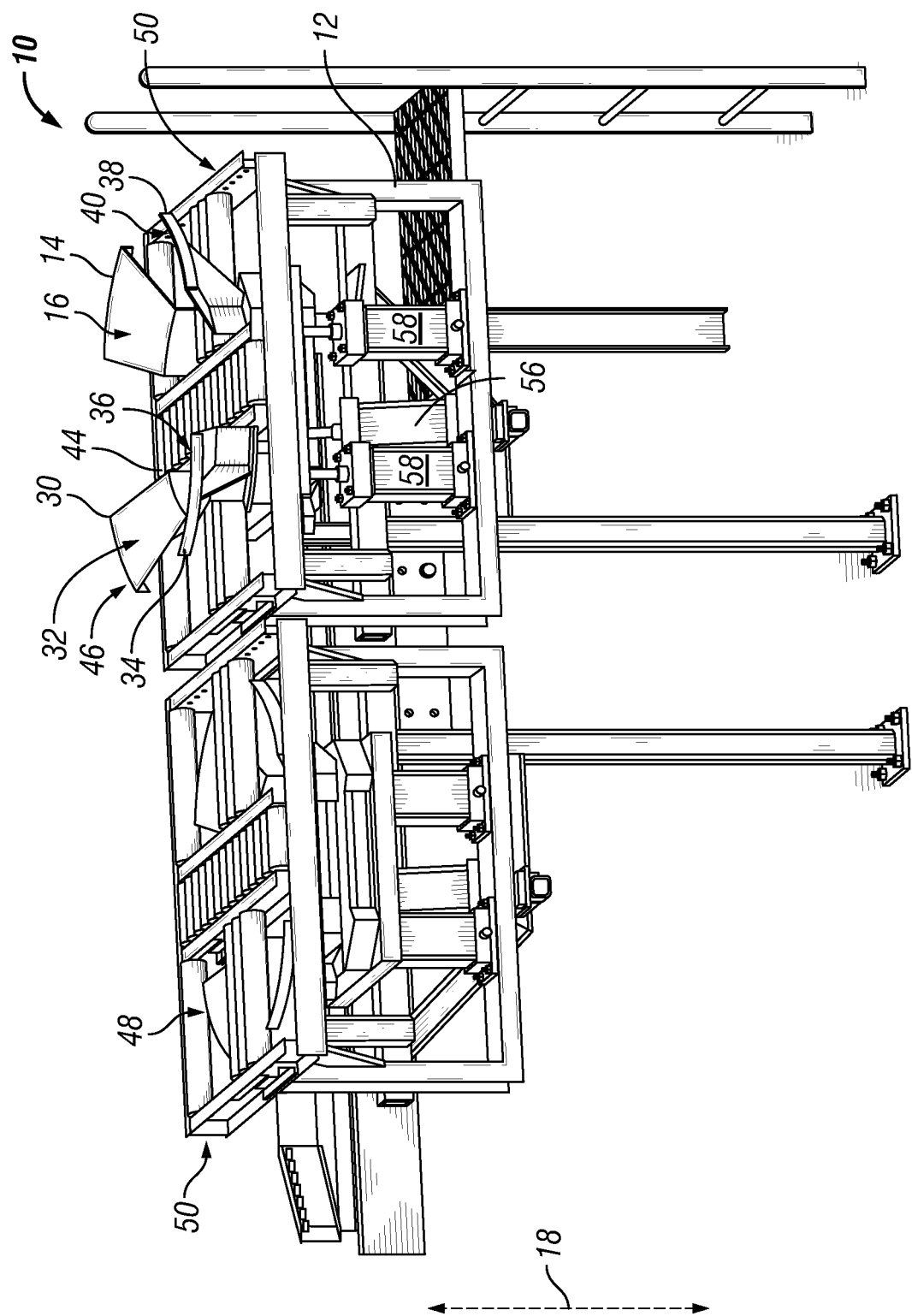
FIG. 2 is a back perspective view of an apparatus in accordance with one exemplary embodiment.
Figure 3:
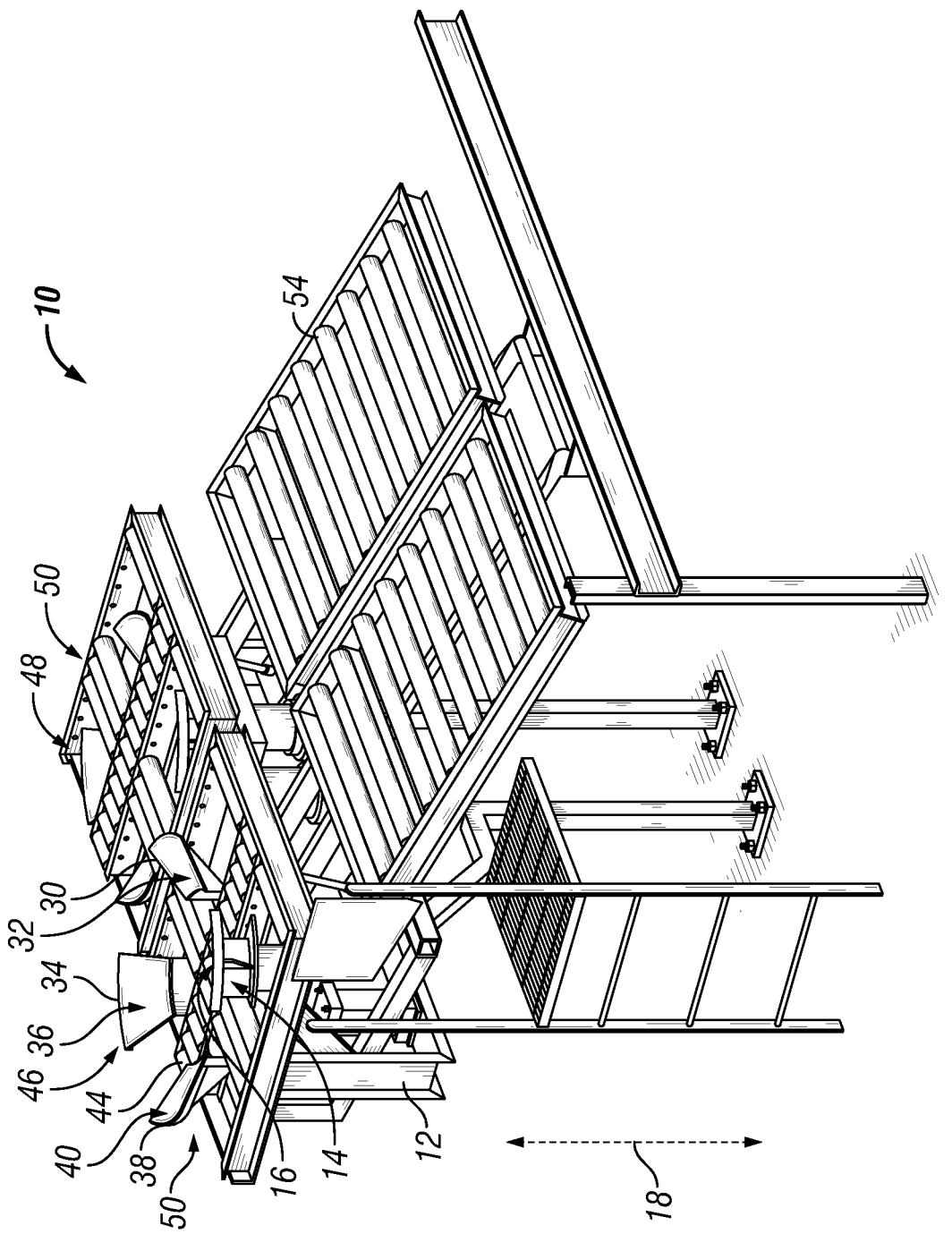
FIG. 3 is a front perspective view of the apparatus of FIG. 2.

FIGS. 2 and 3 illustrate one exemplary embodiment of the apparatus 10 that is used to cool the warm, cured tire 20 after the tire 20 exits the mold after curing. The tire 20 is not illustrated in FIGS. 2 and 3. The apparatus 10 illustrated is capable of holding a pair of tires 20, but is to be understood that the apparatus 10 can be variously configured so that it can hold 1, 3, 4, or any number of cured tires 20 in other embodiments. The apparatus 10 has four segments 14, 30, 34, 38 that engage the cured tire 20 and hold the cured tire 20 for a desired amount of time so that the cured tire 20 can be cooled a desired amount. The segments 14, 30, 34, 38 are mounted onto a frame 12 and are movable with respect to the frame 12. The frame 12 can be variously configured and can include various types of materials. The frame 12 itself may be stationary with respect to the ground or could be movable relative to the ground. The set of segments 14, 30, 34, 38 are shown in the extended position 46 in which they are capable of receiving and holding the tire 20. The segments 14, 30, 34, 38 can be moved into a retracted position 48 in which they are not capable of receiving or holding the tire 20. In FIGS. 2 and 3, one set of segments 14, 30, 34, 38 are shown in the extended position 46 while the other set of segments 14, 30, 34, 38 for holding the second tire 20 are shown in the retracted position 48. The frame 12 carries a series of frame rollers 44 that form a surface onto which the tire 20 could be placed. The segments 14, 30, 34, 38 can move between the extended and retracted positions 46, 48 in the vertical direction 18 through openings in the frame rollers 44. The frame rollers 44 can support the cured tire 20 thereon and facilitate movement of the cured tire 20 off of the frame 12 and onto rollers of an exit conveyor 54. The frame 12 may be movable relative to the ground or the vertical direction 18 such that frame 12 can be pivoted between a horizontal position 50 and an inclined position 52. As shown, the frame 12 is in the horizontal position 50 such that the frame rollers 44 do not align with the rollers of the exit conveyor 54.

Figure 4:
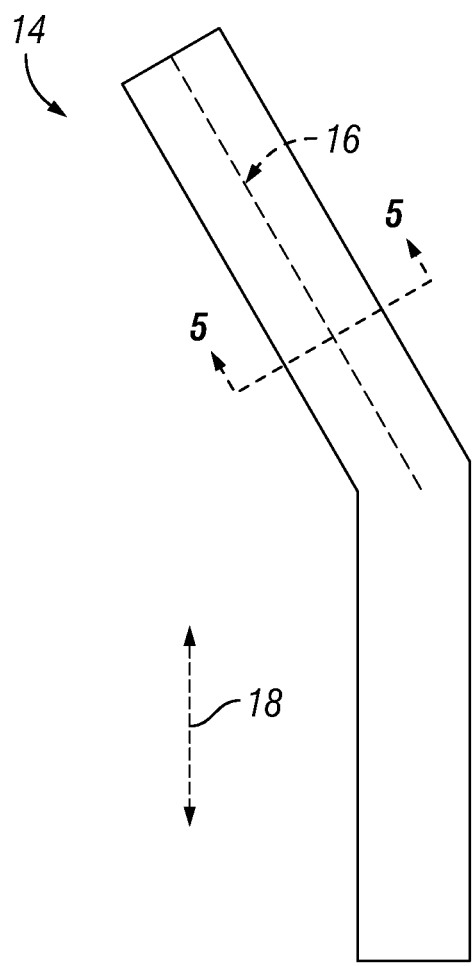
FIG. 4 is a side view of a first cup segment.
Figure 5:
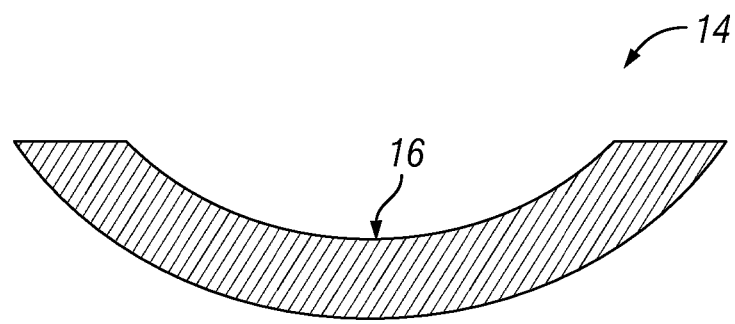
FIG. 5 is a cross-sectional view along line 5-5 of FIG. 4.

An exemplary embodiment of the first cup segment 14 is shown with reference to FIGS. 4 and 5. Here, the first cup segment 14 has a base portion that extends in the vertical direction 18, and an inclined portion that is inclined relative to the base portion and is likewise inclined relative to the vertical direction 18. A first contact surface 16 is present on the inclined portion and is the surface of the first cup segment 14 that actually engages the cured tire 20. The first contact surface 16 does not extend completely in the vertical direction 18 but is instead inclined so that it extends at an angle to the vertical direction 18. The first contact surface 16 may be oriented at a 45 degree angle to the vertical direction 18. In other embodiments, the first contact surface 16 is oriented from 10-20 degrees, from 20-30 degrees, from 30-40 degrees, from 40-50 degrees, from 50-60 degrees, or up to 75 degrees to the vertical direction 18. Additionally, the first contact surface 16 is not a flat surface but is instead concave in shape. FIG. 5 shows a cross-section of the inclined portion that reveals the curved shape of the first contact surface 16. The curved shape allows the first contact surface 16 to better engage the cured tire 20 as the cured tire 20 itself has a round, convex surface that would be complimentary to the concave first contact surface 16. The concave shape of the first contact surface 16 can extend along the entire inclined portion of the first cup segment 14, or in other embodiments may extend along only a portion of the length of the inclined section of the first cup segment 14. In this regard, the length is the amount of the inclined section from the base portion to its top. The incline portion of the various cup segments presents a surface that increase and decreases in diameter in the vertical direction 18 so that the apparatus 10 can be used with different sized tires 20.

Figure 6:
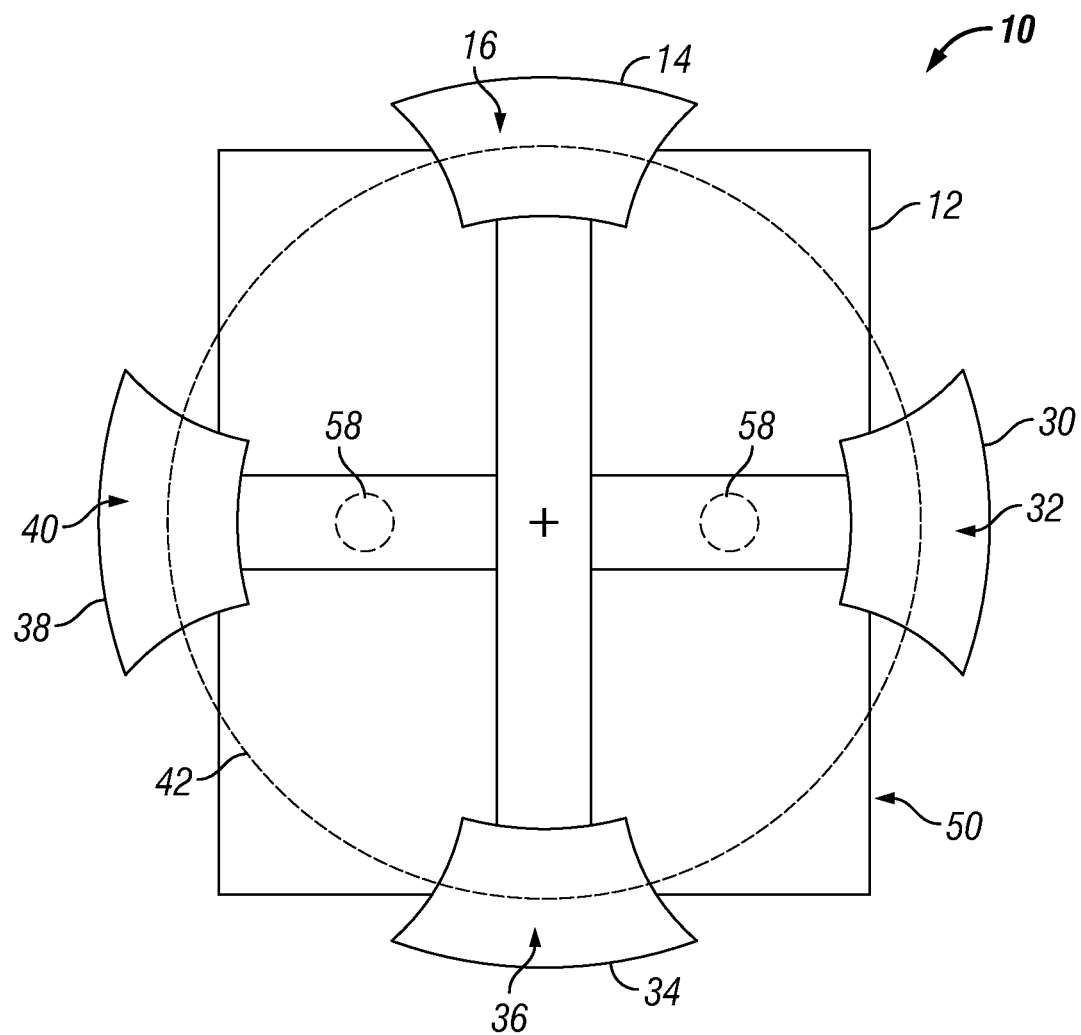
FIG. 6 is a top view of the apparatus in accordance with another exemplary embodiment.

The second, third, and fourth cup segments 30, 34, 38 may be configured in the same manner as previously discussed with respect to the first cup segment 14 and a repeat of this information is not necessary. Similarly, the second, third, and fourth contact surfaces 32, 36, 40 may be configured in the same manner as previously discussed with respect to the first contact surface 16 and a repeat of this information is not necessary. Another embodiment of the apparatus 10 is illustrated with reference to FIG. 6 in which the four cup segments 14, 30, 34, 38 are present each having the four contact surfaces 16, 32, 36, 40. The cup segments 14, 30, 34, 38 are all configured in the same manner as one another and are all spaced from one another so as not to be in contact with one another. The four contact surfaces 16, 32, 36, 40 are arranged with respect to one another so as to be located along a circumference of a circle 42. The arranged contact surfaces 16, 32, 36, 40 are set up so as to be located on portions of a cone that would otherwise be placed between the cup segments 14, 30, 34, 38 that would engage the contact surfaces 16, 32, 36, 40. The contact surfaces 16, 32, 36, 40 are spaced from and not in contact with one another. The cup segments 14, 30, 34, 38 are mounted onto a series of bars that are in turn supported by and acted upon by two cup segment cylinders 58. The cup segment cylinders 58 are in turn supported by the frame 12. Upon actuation, the cup segment cylinders 58 may push the bars and consequently the mounted cup segments 14, 30, 34, 38 upwards in the vertical direction 18, and then subsequently downward in the vertical direction 18 when desired. Although two cup segment cylinders 58 are shown, any other number may be employed in other embodiments such as 1, 3, or 4. In some instances the cup segments 14, 30, 34, 38 could each have their own independent cup segment cylinder 58, or they may be linked such that one or more cup segment cylinders 58 actuate simultaneously at least two of the cup segments 14, 20, 34 or 38. Although described as using cylinders 58 for actuation, the cup segments 14, 20, 34, 38 may be actuated and moved by any device in other embodiments such as gears, sliders, linkages, or other linear actuators.

Figure 7:
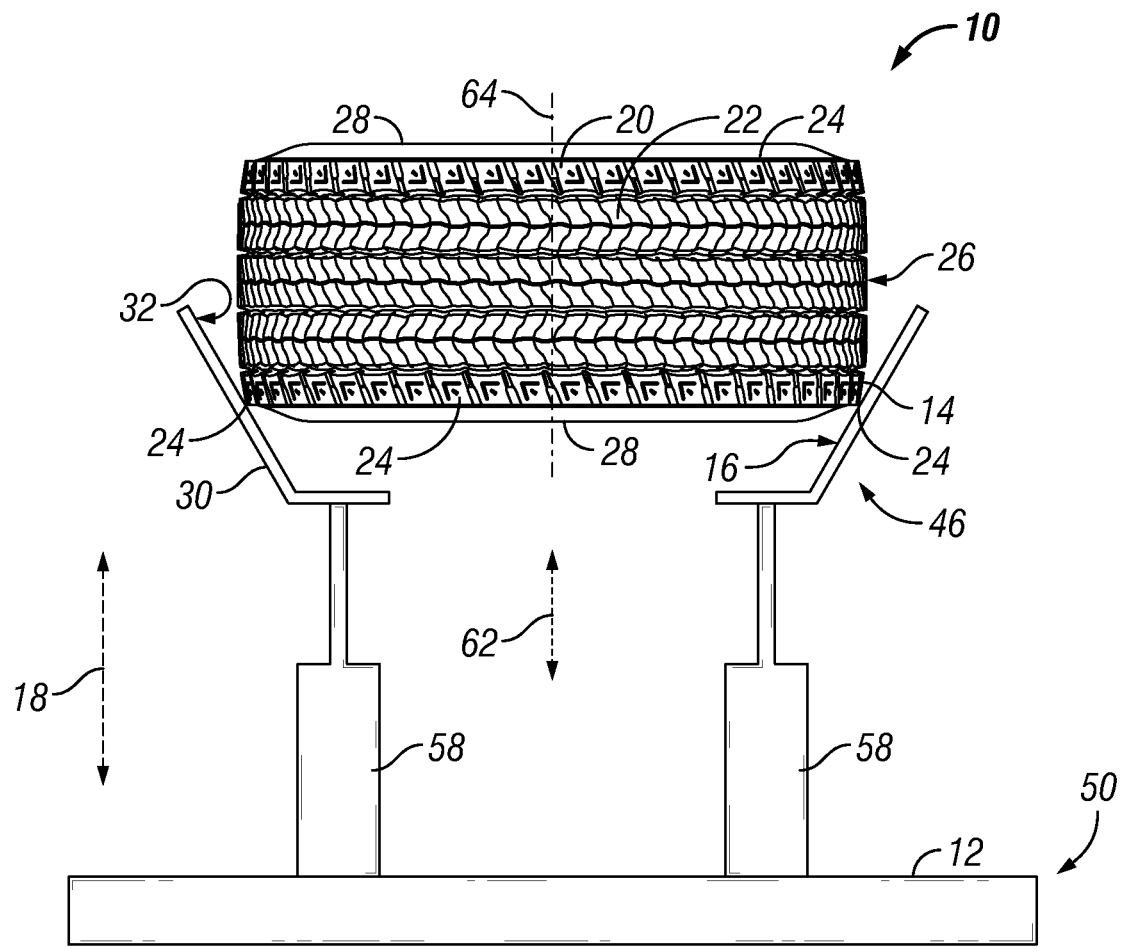
FIG. 7 is a side view of the apparatus holding a tire in accordance with another exemplary embodiment.

With the cup segments 14, 30, 34, 38 in the extended position 46 the cured tire 20 from the mold may be placed thereon for cooling. Any mechanism of moving the cured tire 20 from the mold to the apparatus 10 may be employed. Still further, the mold may be above the apparatus 10 such that upon opening the tire 20 is dropped onto the apparatus 10 without the need for any other transfer mechanism. Another embodiment of the apparatus 10 shown with reference to FIG. 7 in which only two cup segments 14, 30 are present instead of four, with each cup segment 14, 30 having its own associated cup segment cylinder 58 for moving them 14, 30 in the vertical direction 18. The cured tire 20 is placed onto the cup segments 14, 30 so that its axis 64 extends in the vertical direction 18, with the axial direction 62 extending in the vertical direction 18. The apparatus 10 is designed so that the first and second contact surfaces 16, 32 engage only the tread 22 and do not engage the sidewall 28. The inclined and curved features of the contact surfaces 16, 32 allow for engagement with the tire 20 so that only the tread 22 is contacted. In particular, the engagement is one of the tread edges 24 with the contact surfaces 16, 32. The other tread edge 24 at the top of the tire 20 is not engaged at all by the contact surfaces 16, 32. The tread contact surface 26 may be free from engagement with contact surfaces 16, 32, but in other embodiments the tread contact surface 26 may in fact engage the contact surfaces 16, 32 when the tire 20 is held for cooling. Neither one of the sidewalls 28 is engaged by the contact surfaces 16, 32 or by any other portion of the apparatus 10. In the illustrated position, the tire 20 may be held by the cup segments 14, 30 until it has cooled a desired amount. The positioning of the tire 20 on the apparatus 10 and engagement with only the tread 22 may prevent deformation of the tire 20 and does not require the tire 20 to be inflated or otherwise pressurized during the cooling process. Instead, the tire 20 remains unpressurized during its cooling while resting upon the cup segments 14, 30. In tire building, the tread 22 is placed onto the carcass of the tire 20 which includes belts and tissue different from that of the tread 22. It is this tread 22 that engages the contact surfaces 16, 32 and not any other portion of the tire 20. This engagement need not be a line engagement, but can be a surface engagement between a portion of the tread 22 and the contact surfaces 16, 32. While being held by the apparatus 10, the tire 20 is only engaged at the tread 22 by the contact surfaces 16, 32, 36, 40, and the tire 20 engages no other portion of the apparatus 10 besides the contact surfaces, and every other portion of the tire outside of the tread 22 is not engaged by anything. The tire 20 is held by the cup segments 14, 30 for a desired amount of time so that the tire 20 cooled a desired amount. Engagement of the tire 20 at only the tread 22 prevents deformation of the sidewall 28 or other portions of the tire during the cooling process. The apparatus 10 thus allows the tire 20 to cool without the need to keep the tire 20 inflated during cooling, and maintains the final desired shape of the tire 20 after cooling.

Figure 8:
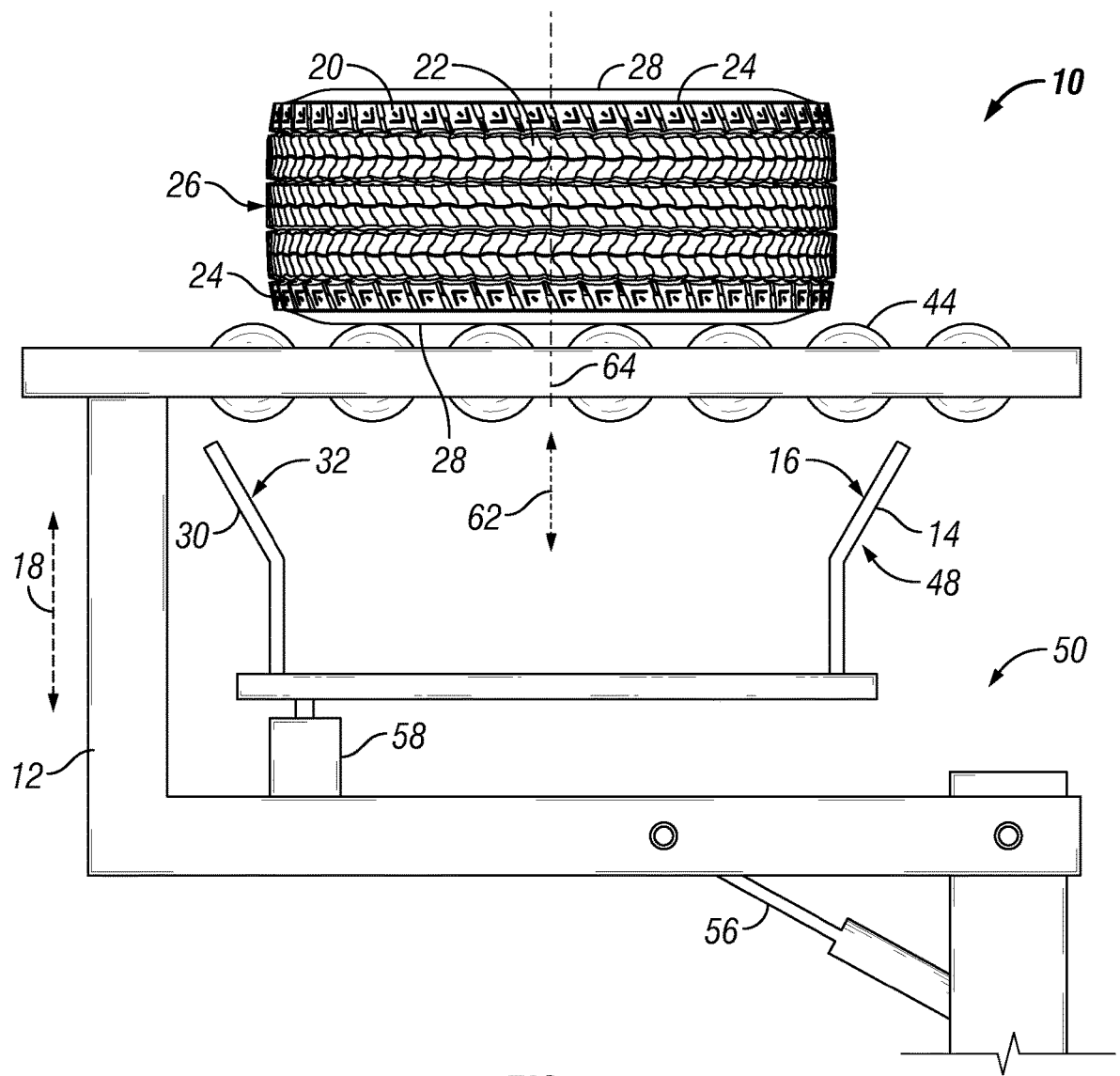
FIG. 8 is a side view of the apparatus with cup segments disengaged from the tire and the tire on frame rollers in accordance with another exemplary embodiment.

FIG. 8 shows another exemplary embodiment of the apparatus 10 in which two cup segments 14, 30 are again present, but in which the frame 12 and cup segment cylinder 58 is configured differently from those previously discussed. When sufficient cooling has taken place, the cup segment cylinder 58 is actuated so that it moves downward in the vertical direction 18 into a retracted position as shown. As the cup segments 14, 30 move through the openings in the frame rollers 44, the tire 20 is lowered until it lays onto the surface formed by the frame rollers 44. In this regard, the sidewall 28 engages the frame rollers 44, and the tread 22 including the tread edge 24 does not engage the frame rollers 44. The cup segment cylinder 58 is carried by the frame 12, and the portion of the frame 12 that includes the frame rollers 44 and holds the cup segment cylinder 58 is pivoted on a post. A frame cylinder 56 is mounted onto this portion of the frame 12 and the post as shown and upon actuation causes this portion of the frame 12 to pivot about the post. The frame 12 is illustrated in the horizontal position 50 in FIG. 8, and actuation of the frame cylinder 56 causes the frame 12 to pivot into the inclined position 52. Although but a single frame cylinder 56 is shown, any number of frame cylinders 56 can be used in other embodiments, and in yet further embodiments the frame 12 may be pivoted through the use of other mechanisms such as gears, sliders, or linkages.

Figure 9:
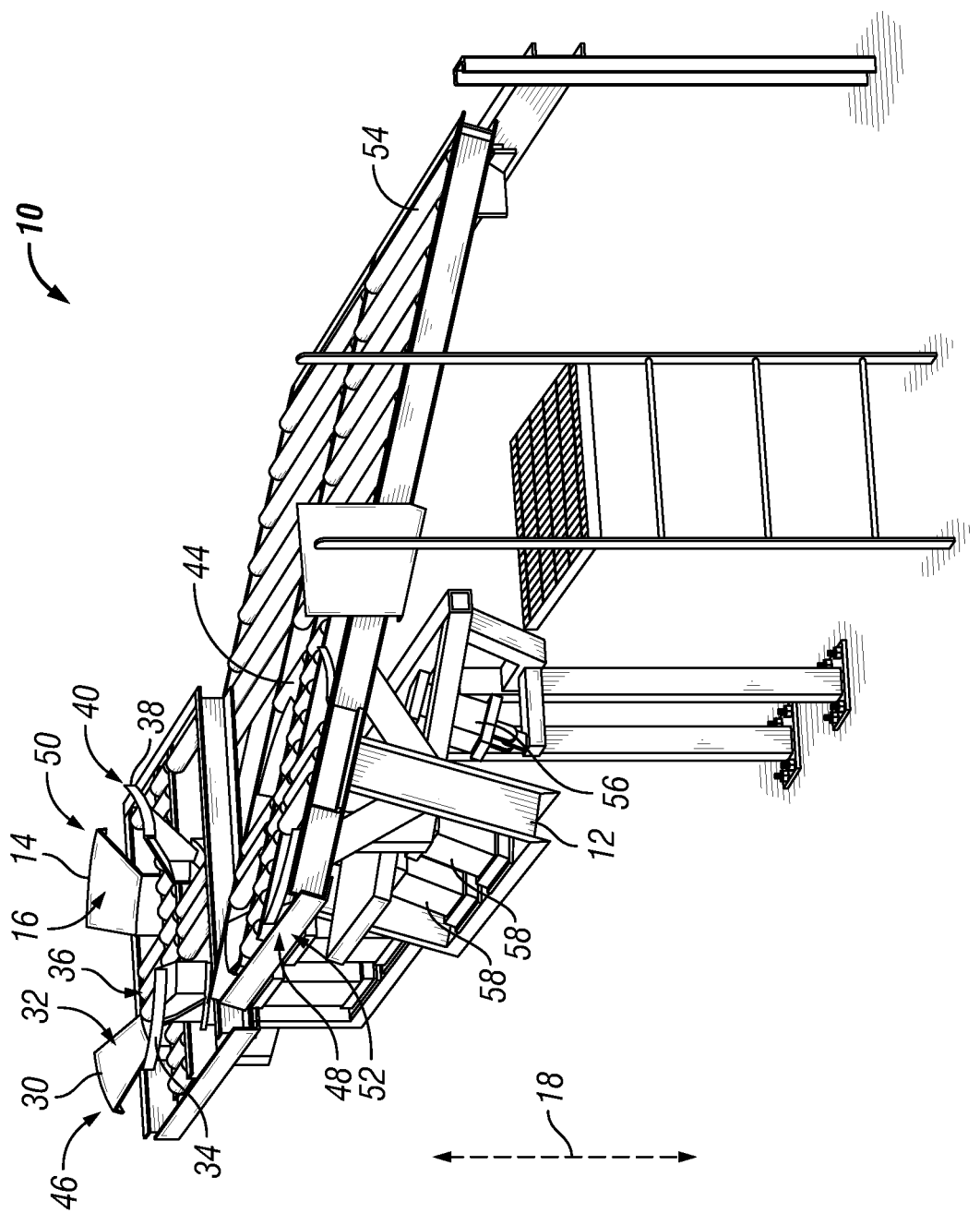
FIG. 9 is a perspective view of an apparatus inclined to align with an exit conveyor in accordance with another exemplary embodiment.

Another exemplary embodiment is shown in FIG. 9 in which the apparatus 10 has two frames 12 with corresponding cup segments 14, 30, 34, 38 so that two tires 20 can be held and cooled at the same time. The exit conveyor 54 with rollers is positioned next to the frames 12, and one of the frames 12 is moved via the frame cylinder 56 in to the inclined position 52 in which the frame rollers 44 align with the rollers of the exit conveyor 54. With this alignment, a cooled tire 20 on the frame rollers 44 can be easily moved off and down the aligned rollers of the exit conveyor 54 to a desired location. As can be realized, pivoting of the frame 12 from the horizontal position 50 to the inclined position 52 causes the cup segment cylinders 58 to likewise pivot along with the cup segments 14, 30, 34, 38 and the frame rollers 44. The other one of the frames 12 is in the horizontal position 50 in which the cup segments 14, 30, 34, 38 are in the extended position 46 and could be holding a tire 20 for cooling. In the horizontal position 50, the frame rollers 44 are not aligned with the rollers of the exit conveyor 54.

Figure 10:
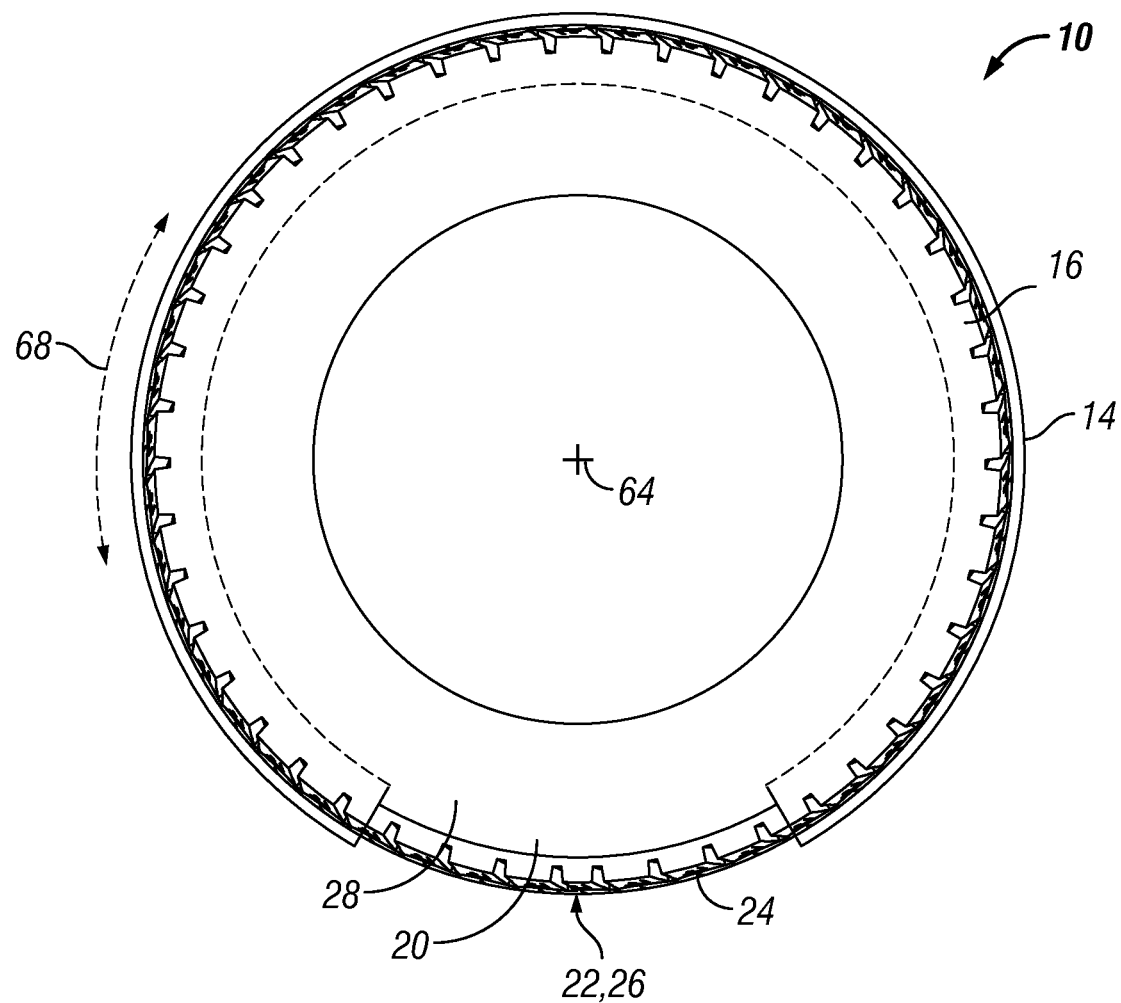
FIG. 10 is a top view of a tire held by an apparatus featuring a single cup segment in accordance with another exemplary embodiment.

Although described as being pivotal between horizontal and inclined positions 50 and 52, the apparatus need not do this in other embodiments and can instead be in a single position. Further, although the previous embodiments describe cup segments 14, 30, 34, 38 that move between extended and retracted positions 46, 48 the segments 14, 30, 34, 38 may remain stationary in other embodiments. In these instances, a robot or human could remove the cooled cured tire 20 from the stationary segments 14, 30, 34, 38, and for placement a robot could position the warm, cured tire 20 or it may drop directly from the mold onto the segments 14, 30, 34, 38 by way of the press placing the cured tire 20 after curing. As stated, any number of cup segments 14, 30, 34, 38 may be present in the apparatus 10 in other embodiments. FIG. 10 shows an additional exemplary embodiment in which but a single first cup segment 14 is present. The single first cup segment 14 extends about 270 degrees around axis 64 with a single opening separating the two ends of the single first cup segment 14. In other arrangements, the single first cup segment 14 extends the entire way, 360 degrees, about the axis 64 without a space being present. It is to be understood that the preferred embodiment of the design includes spacing around multiple portions of the circumference and the inclusion of a plurality of the cup segments. The cured tire 20 rests onto the first contact surface 16 so that only the tread edge 24 engages the first contact surface 16 and no other portion of the cured tire 20 touches the first contact surface 16.

Although described as moving the cup segments 14, 30, 34, 38 in the vertical direction 18 below the surface of the frame rollers 44, other embodiments are possible. For example, the cup segments 14, 30, 34, 38 could instead move radially outward or otherwise in the horizontal direction, instead of the vertical direction 18, so that the tire 20 can be lowered onto the frame rollers 44 for movement to the subsequent processing station. Applicant has discovered that tires 20 cooled using the present apparatus 10 resulted, surprisingly, in tire handling performance gains.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus, comprising:
   a frame;
   a warm, cured tire;
   a plurality of cup segments, wherein the plurality of cup segments includes a first cup segment that has a first contact surface that is both curved and that is inclined relative to a vertical direction, wherein all of the cup segments of the apparatus are movable relative to the frame simultaneously from a retracted position to an extended position in which the warm, cured tire is held by all of the cup segments of the apparatus; and
   wherein when the first cup segment is in the extended position the first contact surface engages the warm, cured tire, wherein the tire has a tread with a tread edge and a tread contact surface and wherein the tire has a sidewall, and wherein the first contact surface engages the tread and does not engage the sidewall; and
   a plurality of frame rollers carried by the frame, wherein the first cup segment is movable relative to the frame rollers, and wherein in the retracted position the first contact surface is free from engagement with the warm, cured tire and the frame rollers engage the warm, cured tire;
   wherein the frame is pivotable between a horizontal position and an inclined position to cause all of the plurality of the frame rollers to be pivotable between the horizontal position and the inclined position;
   an exit conveyor that has a plurality of rollers, wherein the exit conveyor is inclined relative to the vertical direction such that the plurality of rollers of the exit conveyor are aligned with the frame rollers when the frame is in the inclined position, wherein the exit conveyor is configured to receive the cured tire after the cured tire exits the frame rollers.

2. The apparatus as set forth in claim 1, wherein the first contact surface engages the tread edge.

3. The apparatus as set forth in claim 1, wherein the first contact surface is not configured for engaging the tread contact surface for holding.

4. The apparatus as set forth in claim 1, wherein the plurality of cup segments has a second cup segment that has a second contact surface that is both curved and that is inclined relative to the vertical direction;
   wherein the second contact surface engages the warm, cured tire for holding, and wherein the second contact surface engages the tread and is not configured for engaging the sidewall for holding.

5. The apparatus as set forth in claim 4, wherein the plurality of cup segments has a third cup segment that has a third contact surface that is both curved and that is inclined relative to the vertical direction;
   wherein the third contact surface engages the warm, cured tire for holding, and wherein the third contact surface engages the tread and is not configured for engaging the sidewall for holding; and
   wherein the plurality of cup segments has a fourth cup segment that has a fourth contact surface that is both curved and that is inclined relative to the vertical direction;
   wherein the fourth contact surface engages the warm, cured tire for holding, and wherein the fourth contact surface engages the tread and is not configured for engaging the sidewall for holding.

6. The apparatus as set forth in claim 5, wherein the first contact surface, the second contact surface, the third contact surface, and the fourth contact surface all lie on a circumference of a circle, and wherein the first contact surface, the second contact surface, the third contact surface, and the fourth contact surface engage the tread edge for holding.

7. The apparatus as set forth in claim 6, wherein the first contact surface, the second contact surface, the third contact surface, and the fourth contact surface are not configured for engaging the tread contact surface for holding.

8. The apparatus as set forth in claim 1, wherein the pivoting of the frame between the horizontal position and the inclined position causes the first cup segment to be pivotable between the horizontal position and the inclined position.

9. An apparatus, comprising:
   a frame;
   a warm, cured tire;
   a plurality of cup segments, wherein the plurality of cup segments includes a first cup segment that has a first contact surface that is both curved and that is inclined relative to a vertical direction, wherein all of the cup segments of the apparatus are movable relative to the frame simultaneously from a retracted position to an extended position in which the warm, cured tire is held by all of the cup segments of the apparatus;
   wherein when the first cup segment is in the extended position the first contact surface engages the warm, cured tire, wherein the tire has a tread with a tread edge and a tread contact surface and wherein the tire has a sidewall, and wherein the first contact surface engages the tread and does not engage the sidewall;
   a plurality of frame rollers carried by the frame, wherein the first cup segment is movable relative to the frame rollers, and wherein in the retracted position the first contact surface is free from engagement with the warm, cured tire and the frame rollers engage the warm, cured tire;
   wherein the frame is pivotable between a horizontal position and an inclined position to cause the frame rollers to be pivotable between the horizontal position and the inclined position;
   wherein the pivoting of the frame between the horizontal position and the inclined position causes the first cup segment to be pivotable between the horizontal position and the inclined position; and
   an exit conveyor that has a plurality of rollers, wherein the exit conveyor is inclined relative to the vertical direction such that the plurality of rollers of the exit conveyor are aligned with the frame rollers when the frame is in the inclined position, wherein the exit conveyor is configured to receive the cured tire after the cured tire exits the frame rollers.

10. The apparatus as set forth in claim 1, further comprising a frame cylinder that engages the frame and that moves the frame between the horizontal position and the inclined position.

11. The apparatus as set forth in claim 1, further comprising a cup segment cylinder that engages the frame and that moves the first cup segment between the extended position and the retracted position.

* * * * *